United States Patent
Abd Elhamid et al.

(10) Patent No.: US 7,205,058 B2
(45) Date of Patent: Apr. 17, 2007

(54) RESIDUAL STACK SHUTDOWN ENERGY STORAGE AND USAGE FOR A FUEL CELL POWER SYSTEM

(75) Inventors: Mahmoud H Abd Elhamid, Grosse Pointe Woods, MI (US); James S Siepierski, Williamsville, NY (US); Joseph D Rainville, Caledonia, NY (US)

(73) Assignee: General Motors Corporation, Detriot, MI (US)

( * ) Notice: Subject to any disclaimer, the term of this patent is extended or adjusted under 35 U.S.C. 154(b) by 502 days.

(21) Appl. No.: 10/712,133

(22) Filed: Nov. 13, 2003

(65) Prior Publication Data

US 2005/0106424 A1    May 19, 2005

(51) Int. Cl.
*H01M 8/04*    (2006.01)
*H01M 16/00*    (2006.01)

(52) U.S. Cl. .............................. 429/13; 429/9; 429/22; 429/34

(58) Field of Classification Search ................. 429/9, 429/13, 22, 23, 24, 34
See application file for complete search history.

(56) References Cited

U.S. PATENT DOCUMENTS

| | | | |
|---|---|---|---|
| 6,612,385 B1 * | 9/2003 | Stuhler et al. | 429/23 X |
| 6,811,908 B2 * | 11/2004 | Edlund et al. | 429/24 X |
| 6,858,336 B2 * | 2/2005 | Reiser et al. | 429/13 |
| 6,991,864 B2 * | 1/2006 | Fredette | 429/22 |
| 2003/0087138 A1 * | 5/2003 | Margiott et al. | 429/22 X |

* cited by examiner

*Primary Examiner*—Stephen J. Kalafut
(74) *Attorney, Agent, or Firm*—Harness, Dickey & Pierce, P.L.C.

(57) ABSTRACT

A fuel cell system is provided for storing energy created from the reaction of residual gases at shutdown of a fuel cell stack. This energy can then be used for powering a component of the fuel cell stack and enables air to be used to purge the anode gas.

16 Claims, 2 Drawing Sheets

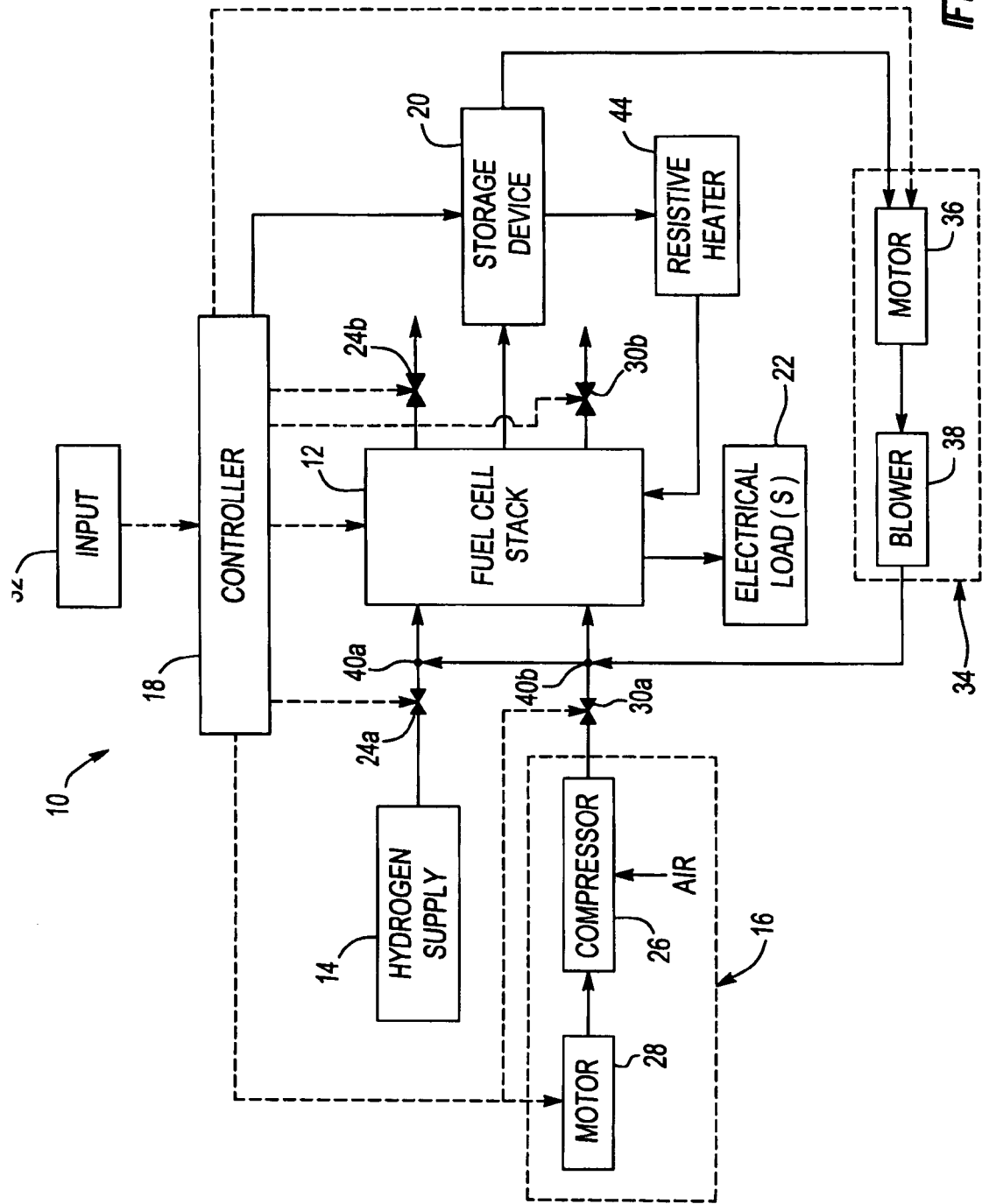

RESIDUAL STACK SHUTDOWN ENERGY STORAGE AND USAGE FOR A FUEL CELL POWER SYSTEM

FIELD OF THE INVENTION

The present invention relates to fuel cell systems, and more particularly, to storing of residual fuel cell stack shutdown energy.

BACKGROUND OF THE INVENTION

Fuel cell systems include a fuel cell stack that produces electrical energy based on a reaction between a hydrogen-based feed gas (e.g., pure hydrogen or a hydrogen reformate) and an oxidant feed gas (e.g., pure oxygen or oxygen-containing air). The hydrogen-based feed gas and oxidant feed gas are supplied to the fuel cell stack at appropriate operating conditions (i.e., temperature and pressure) for reacting therein. The proper conditioning of the feed gases is achieved by other components of the fuel cell stack to provide the proper operating conditions.

A fuel cell stack will generally contain residual amounts of hydrogen and oxidant feed gases after shutdown. This potential electrical energy is lost if it is not used or stored. Accordingly, a need exists for a system able to use or store this potential electrical energy.

SUMMARY OF THE INVENTION

The present invention provides a fuel cell system having a storage device for storing the electrical energy resulting from the shutdown of a fuel cell stack. The reacting of residual gases creates this electrical energy which can be used to power an electric motor for a compressor during subsequent fuel cell start-up. Alternatively, the stored energy could be used to power resistive heating plates which warm the fuel cell stack to assist with cold start-ups. The continual reacting of the residual hydrogen gases after shutdown also enables the fuel cell stack to be purged with air.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a schematic illustration of a fuel cell system including a residual electrical energy storage device according to an alternative embodiment of the present invention; and

DETAILED DESCRIPTION OF THE PREFERRED EMBODIMENTS

Figure 1:
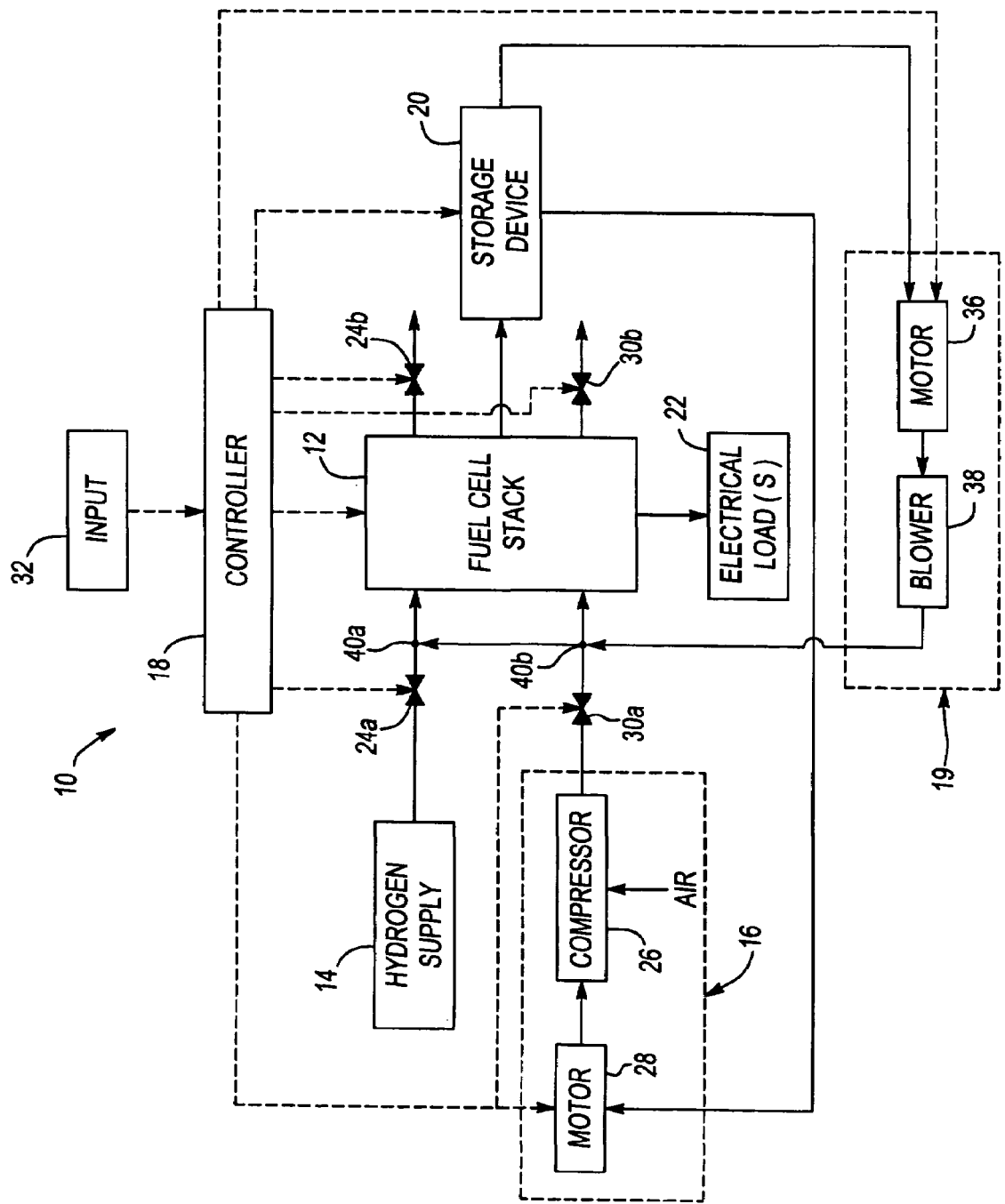
FIG. 1 is a schematic illustration of a fuel cell system including a residual electrical energy storage device according to the present invention.

The following description of the preferred embodiments is merely exemplary in nature and is in no way intended to limit the invention, its application, or uses.

Referring now to FIG. 1, a fuel cell system 10 is shown. The fuel cell system 10 includes a fuel cell stack 12 coupled to a hydrogen supply unit 14 and an oxygen supply unit 16, a controller 18, a purge blower system 19 and a residual electrical energy storage device 20. The fuel cell stack 12 produces electrical power to power an electrical load or loads 22. The electrical load(s) 22 can include an electric motor, lights, heaters or any other type of electrically powered components.

The hydrogen supply unit 14 supplies a hydrogen feed gas to the fuel cell stack 12. In the case of the hydrogen feed gas being pure hydrogen, the hydrogen supply unit 14 includes a storage vessel and the associated plumbing and controls (not shown) to supply the hydrogen to the fuel cell stack 12. In the case of the hydrogen feed gas being a hydrogen reformate, the hydrogen supply unit 14 includes a storage vessel for storing a base fuel and the components, plumbing and controls (not shown) required to dissociate the base fuel into the hydrogen containing feed gas and to supply the hydrogen feed gas to the fuel cell stack 12. A valve 24b coupled to the controller 18 regulates the flow of the hydrogen feed gas through the fuel cell stack 12. A corresponding valve 24a is in communication with the controller 18 and enables the controller 18 to "bottle up" the hydrogen feed gas within the fuel cell stack 12 during shutdown. When the valve 24b is opened with the valve 24a being closed, the anode flow channels of the fuel cell system 10 can be purged by the purge blower system 19.

The oxygen supply unit 16 provides an oxidant feed gas to the fuel cell stack 12. The oxidant feed gas is generally provided as oxygen-rich air. Thus, the oxygen supply unit 16 generally includes a compressor 26, an electric motor 28 and plumbing (generally shown) required to supply the oxidant feed gas to the fuel cell stack 12. A valve 30b in communication with the controller 18 regulates the flow of the oxidant feed gas into the fuel cell stack 12. Similarly, a corresponding valve 30a is in communication with the controller 18 and enables the controller 18 to "bottle up" the oxidant feed gas within the fuel cell stack 12 during shutdown. In particular, when the valve 30b is opened with the valve 30a being closed, the cathode flow channels of the fuel cell system 10 can be purged by the purge blower system 19.

The controller 18 is coupled to the valves 24a, 24b and 30a, 30b to initiate a reaction in the fuel cell stack 12 upon a start-up command from the input 32. Specifically, the controller 18 engages the electric motor 28 and opens the valves 24, 30 such that the hydrogen feed gas and oxidant feed gas enter the fuel cell stack 12 to begin the production of electrical energy. When the controller 18 receives a shutdown command from the input 32, it closes all of the valves 24a, 24b, 30a and 30b, such that the fuel cell stack 12 is completely bottled up. In a shutdown situation, there is still remaining hydrogen and oxidant feed gases in the fuel cell stack 12, and thus, remaining residual capacity to generate electricity. The purge blower system 19 includes a motor 36 which can be powered by the electrical energy from the electrical energy storage device 20 or an alternative power supply (not shown). The motor 36 in turn drives a blower 38 in the purge blower system 19. The blower 38 introduces air into the fuel cell stack 12 through a first purge valve 40a coupled to the hydrogen feed gas inlet and a second purge valve 40b in communication with the oxidant feed gas inlet. The purge blower system 19 ensures that remaining water and reactants are removed prior to a subsequent start up of the fuel cell system 10.

The residual electrical energy storage device 20 is coupled to the fuel cell stack 12 to store this remaining electricity generated by the remaining hydrogen and oxidant feed gases. The residual electrical energy storage device 20 can be any device capable of storing energy, such as, for example but not limited to, a battery, a capacitor, or an ultra-capacitor. The energy stored in the residual electrical energy storage device 20 can be used on start-up for powering the electric motor 28, of the oxygen supply unit as the electric motor 28 is one of the largest parasitic loads in the fuel cell system 10. This electrical energy may also be used to power motor 36 of the purge blower system 19. In addition, with reference now to FIG. 2, the energy from the residual electrical energy storage device 20 can alternatively be used to power resistive heating plates 44, as shown in FIG. 2. The resistive heating plates 44 provide heat to the fuel cell stack 12 to facilitate faster system response time during cold start-ups.

It is to be understood that these alternative uses for the stored energy are not limiting and that the stored energy can be used for a variety of different purposes either within the fuel cell system or for other components. A further advantage of using the residual electrical energy storage device 20 to recapture the residual energy from the fuel cell stack 12 during shutdown is that it enables the fuel cell stack 12 to be purged with air from the purge blower system 19. Typically, the fuel cell stack 12 has to be purged with nitrogen because of the remaining hydrogen feed gas. By fully reacting the remaining hydrogen feed gas, the fuel cell stack 12 can be purged using air instead, which greatly reduces the cost and complexity of the fuel cell system 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system comprising:
    a fuel cell stack for generating electrical energy;
    a controller for controlling the operation of the fuel cell stack;
    an energy storage device coupled to the fuel cell stack for storing of electrical energy created during a shutdown mode;
    a blower to supply air to the fuel cell stack to purge the fuel cell stack;
    a motor for powering the blower; and
    wherein the motor is coupled to the energy storage device for receipt of electrical energy to power the motor.

2. The system of claim 1 wherein the fuel cell stack further comprises:
    a fuel supply having a first set of upstream and downstream valves for supplying a fuel;
    a oxidant supply having a second set of upstream and downstream valves for supplying an oxidant; and
    wherein the controller closes the first and second valve sets in the shutdown mode.

3. The system of claim 2 wherein the energy generated in the shutdown mode results from the reaction of the remaining fuel and the remaining oxidant in the fuel cell stack after the fuel cell system is shut down.

4. The system of claim 1 wherein the storage device is selected from a group consisting of a capacitor, a battery and combinations thereof.

5. The system of claim 1 further comprising:
    a compressor to supply an oxidant to the fuel cell stack;
    a motor for powering the compressor; and
    wherein the motor is coupled to the energy storage device for receipt of electrical energy therefrom to power the motor.

6. The system of claim 1 further comprising at least one resistive heating plate coupled to the fuel cell stack, wherein the at least one resistive heating plate is coupled to the energy storage device for receipt of electrical energy therefrom.

7. The system of claim 2 wherein the fuel is a hydrogen feed gas.

8. A method for recovering energy during a shutdown of a fuel cell stack in which a first fuel supply and a second fuel supply are interrupted, the method comprising:
    reacting a remaining fuel with a remaining oxidant in the fuel cell stack at shutdown to create electrical energy;
    storing the electrical energy for later use;
    using the stored electrical energy to power a motor coupled to a compressor to facilitate the start-up of the compressor;
    using the compressor to supply an oxidant to the fuel cell stack; and
    purging the fuel cell stack with air after storing the energy.

9. The method of claim 8 further comprising:
    using the stored electrical energy to power at least one resistive heating plate to warm the fuel cell stack during a fuel cell start-up.

10. The method of claim 8 further comprising:
    using the stored energy to power a component of the fuel cell system.

11. The method of claim 8 wherein the storage device is selected from a group consisting of a capacitor, a battery and combinations thereof.

12. The method of claim 8 further comprising:
    using the stored electrical energy to power a motor coupled to a blower to facilitate purging of the fuel cell stack during start-up.

13. A method for purging a fuel cell stack after a shutdown of the fuel cell stack, the method comprising:
    reacting a remaining fuel with a remaining oxidant in the fuel cell stack at shutdown to create electrical energy;
    storing the electrical energy for later use;
    using the stored electrical energy to power a purge system in communication with the fuel cell stack; and
    introducing air into the fuel cell stack from the purge system to purge the fuel cell stack.

14. The method of claim 13 further comprising:
    using the stored electrical energy to power a motor coupled to a compressor to facilitate the start-up of the compressor.

15. The method of claim 13 further comprising:
    using the stored electrical energy to power at least one resistive heating plate to warm the fuel cell stack prior to a start-up.

16. The method of claim 13 wherein the electrical energy is stored in a storage device selected from the group consisting of a capacitor, a battery and combinations thereof.

* * * * *